S. WHEELER.
PROCESS OF AND MACHINE FOR CUTTING SHEET MATERIAL.
APPLICATION FILED MAR. 6, 1918.

1,418,115.

Patented May 30, 1922.

INVENTOR
Seth Wheeler
BY
Prindle, Wright & Small,
ATTORNEYS

S. WHEELER.
PROCESS OF AND MACHINE FOR CUTTING SHEET MATERIAL.
APPLICATION FILED MAR. 6, 1918.

1,418,115.

Patented May 30, 1922.
3 SHEETS—SHEET 3.

INVENTOR
Seth Wheeler
BY
Prindle Wright + Small
ATTORNEYS

UNITED STATES PATENT OFFICE.

SETH WHEELER, OF CASTLETON, NEW YORK.

PROCESS OF AND MACHINE FOR CUTTING SHEET MATERIAL.

1,418,115.     Specification of Letters Patent.    Patented May 30, 1922.

Application filed March 6, 1918. Serial No. 220,758.

*To all whom it may concern:*

Be it known that I, SETH WHEELER, of Castleton, in the county of Rensselaer, and in the State of New York, have invented a certain new and useful Improvement in Processes of and Machines for Cutting Sheet Material, and do hereby declare that the following is a full, clear, and exact description thereof.

The object of my invention has been to provide a process of and machine for cutting sheet material, which shall have the advantage of being able to cut with certainty sheet material which is very thin, and to such ends my invention consists in the process of and machine for cutting sheet material hereinafter specified.

In the accompanying drawings—

My invention is capable of embodiment in many different forms of machine, and of practice by various particular processes, and therefore, while I shall illustrate the machine and process by those forms which I consider to be the best embodiments thereof, my invention is not to be limited to the particular forms illustrated, but my claims are to be broadly interpreted.

Figure 1:
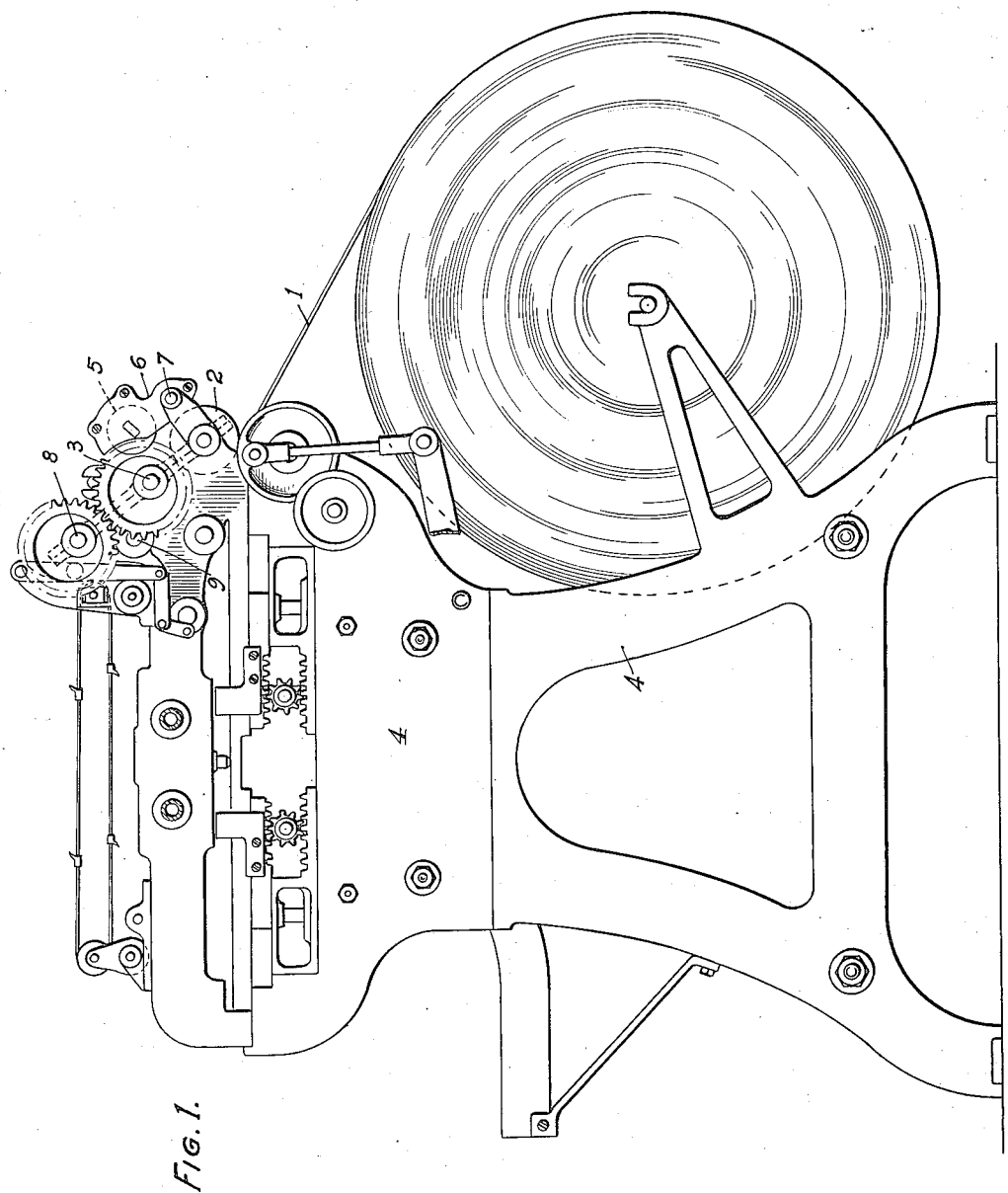
Fig. 1 is a side elevation of a machine embodying my invention.
Figure 2:
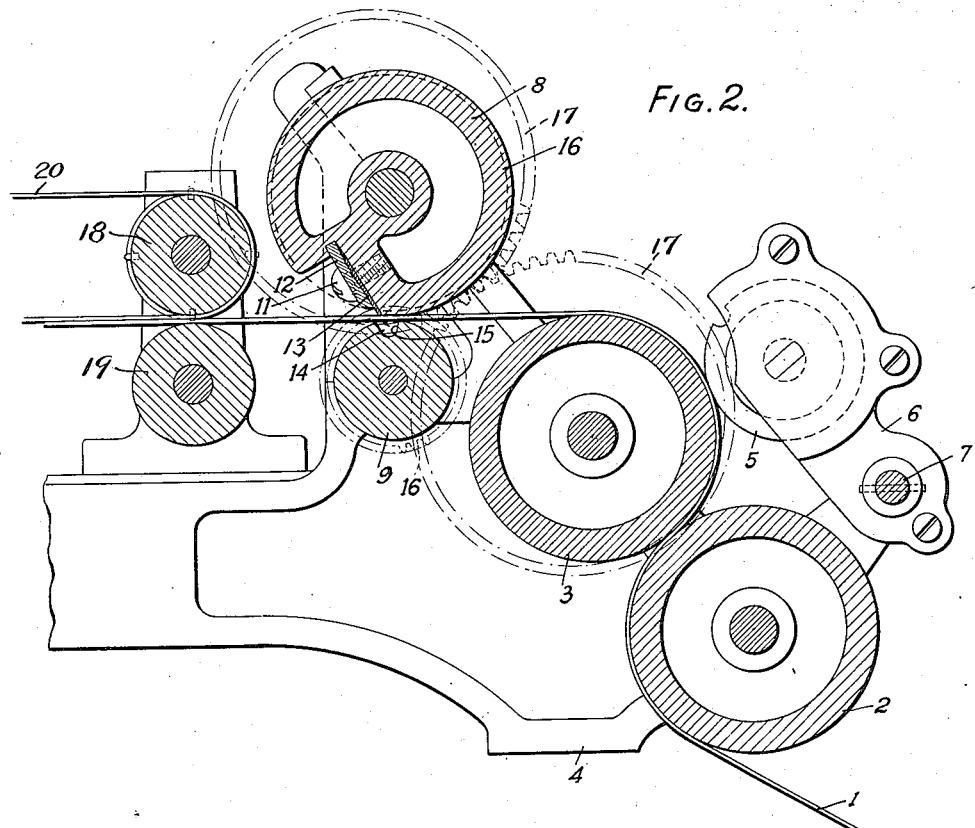
Fig. 2 is a vertical sectional view of the machine shown in Fig. 1.
Figure 3:
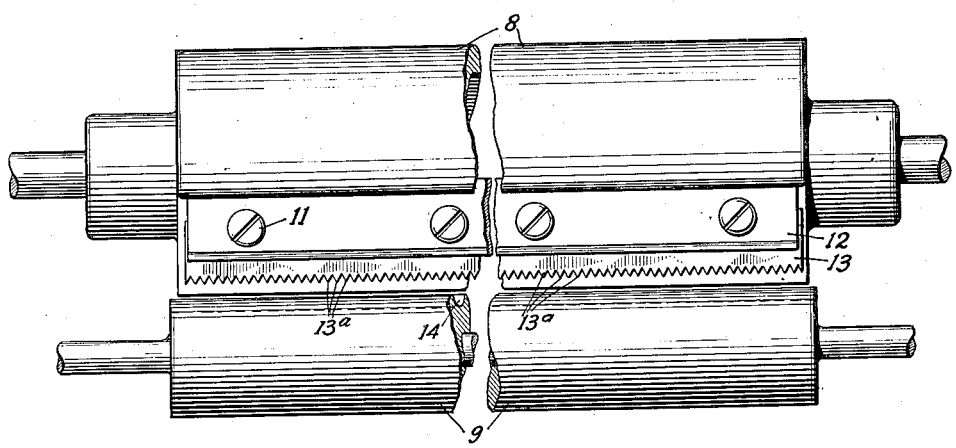
Fig. 3 is an enlarged view of the cutter cylinder and mashing roll.
Figure 4:
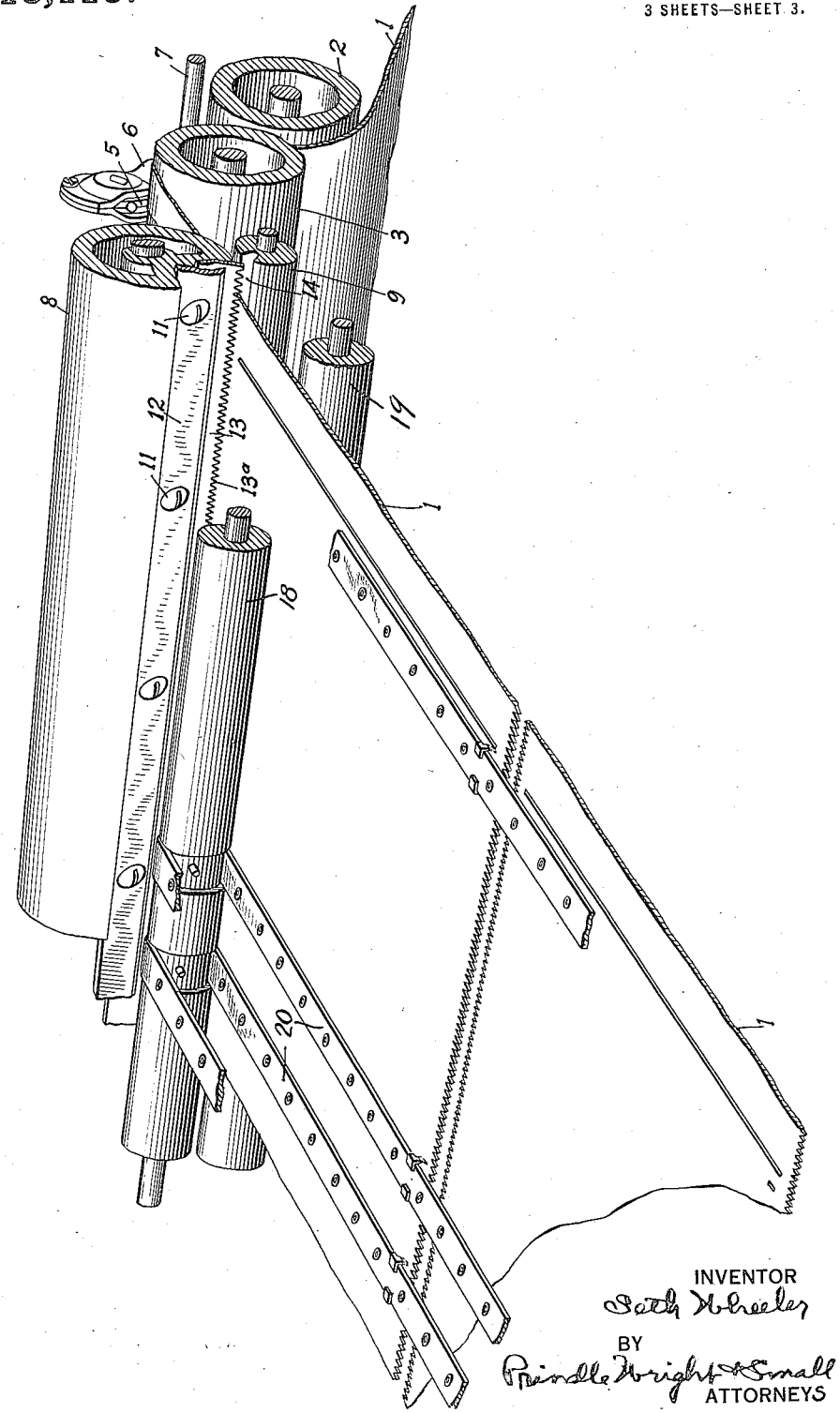
Fig. 4 is a perspective view showing a web of paper and the action of the cutter and mashing roll upon the paper in severing a sheet.

In the machine illustrated in the drawing, a web 1 is led under a roll 2 and over a bed roll 3, said rolls being mounted in bearings in side frames 4 and driven by uniform gearing. The web, in the present instance, being shown wide enough to make a series of sheets or units side by side, is divided longitudinally by dividers 5 which rest upon the bed roll 3. The cutting edges of the dividers, in the present instance, are in the form of disks interrupted at intervals so as to leave little uncut connecting portions or isthmuses connecting the strips of units to keep the transverse rows of units in line with each other, and to prevent some of them getting ahead of others. The dividers are mounted on a shaft in arms 6 that are pivoted at 7 upon brackets carried by the frame. This permits the dividers to rest against and follow any irregularities in the surface of the bed roll. From the bed roll, the web passes between a cutter cylinder 8 and a recessed member shown in the form of a mashing roll 9, which latter co-operates after the manner of a chopping block with a knife 13 on the cutter cylinder. The knife is shown as of rather thin material and is held in place by screws 11 bearing upon a plate 12 that rests upon the knife 13. The knife 13 is preferably provided with serrations or teeth $13^a$, as shown. The mashing roll has a recess or groove 14 having a substantially radial side wall 15 that is adapted to co-operate with the knife, the groove being deep enough to accommodate the knife. The knife also preferably is somewhat rearwardly inclined, as shown in Fig. 2. While the rolls 2 and 3 preferably have a uniform rate of rotation, I cause the knife to travel during its cutting operation at a higher rate of speed than the web of paper, so that it will not only cut the paper but will also move the cut sheet forward and separate it from the web. The teeth of the knife penetrate the paper and not only cause an easier cutting action than would be the case with a straight edge knife, but give the knife a hold upon the unit which enables it to separate it from the web much more easily than a plain knife would do, although my invention is applicable to a plain knife as well. The serrated knife does not have to come close to the mashing cylinder in order to cut effectually, and it does not require sharpening nearly as often as would be the case with a straight edge. I do this because in cutting very thin paper, the paper, having little stiffness, does not stand up and become sheared, but tends to go with the cutter and fold about it. Thus an ordinary cutter will often not completely sever the sheet. The cutting action such as I have described, however, separates the unsevered portions very successfully. In the present instance, I secure such an action by driving the cutter cylinder from the shaft of the bed roll 3 by eccentric gears 17 which are respectively mounted on the shafts of the said cylinder and roll. The gear on the cutter cylinder is so arranged that the portion thereof which is of the shortest radius is in operation when the cutting action is taking place, and this causes the cutter to move more rapidly than the web is being fed. The mashing roll is preferably driven from the cutting cylinder by ordinary concentric gears 16.

After leaving the mashing roll 9, the web passes between suitable rolls 18 and 19 which feed it to the portion of the machine which is to perform the next operation upon the web. As illustrated, a plurality of belts 20 run over roll 18 engage the web, and thus feed it along, the above-described parts also serving to keep the web taut over the recess 14 of the mashing roll during the cutting operation, and insure that the cutter will properly pierce the web.

My said process will be clear from the operation of the machine for practicing it. The paper is fed at a preferably uniform rate between the cutter cylinder and mashing cylinder, and the knife first pierces the paper and passes into recess 14 to at least partially sever the web, and while engaging the paper, or immediately after engaging it, moves faster than the paper, and thus the paper is cut with the ordinary cutting action, and the unit, if not completely severed, is torn away from the web by the faster travel of the cutter. The cutter cylinder 8 and the mashing roll 9 are slightly spaced, whereby the web may pass slidably between these rolls, to prevent them from gripping the web and moving it at a speed equal to the speed of travel of the cutter. The web and cutter may travel at any desired speeds, regular or irregular, and conform to my invention, so long as the cutter, during or immediately after the cutting operation, travels faster than the web.

I claim:

1. In a machine for cutting sheet material, the combination of a feeding roll for a web of sheet material, a dividing disk adapted to slit the web longitudinally as it is fed over the roll, said disk having its cutting edge interrupted so as to leave connecting portions in the web, a mashing roll adapted to receive the paper fed from said feeding roll, a revolving cutter for periodically severing the paper transversely as it passes over said mashing roll, elliptical gears connected to said feeding roll and cutter for driving the latter faster during the cutting operation, and additional gears connected to said cutter for driving said mashing roll.

2. The method of cutting sheet material which comprises feeding forwardly a web of sheet material at a substantially uniform rate, piercing portions of the web by a cutter to at least partially sever the same, and then moving the cutter in the direction of the feed at a speed sufficiently greater than the rate of feed of the web to push forward the cut portion of the web and separate the same completely from the remainder of the web.

3. The method of cutting sheet material, which comprises feeding forwardly a web of sheet material, piercing portions of the web by a cutter to at least partially sever the web, and then moving the cutter in the direction of feed at a speed sufficiently greater than the rate of feed of the web to push forward the cut portion of the web and separate the same completely from the remainder of the web.

4. The method of cutting sheet material, which comprises feeding a web of sheet material over a member having a recess adapted to receive a cutter, moving a cutter through the web and into the recess to pierce the web and at least partially sever the same, and then moving the cutter in the direction of feed at a speed sufficiently greater than the rate of speed of the web to push forward the cut portion of the web and separate the same completely from the remainder of the web.

5. The method set forth in claim 3, wherein the web is maintained taut over the recessed member during the step of piercing the web by the cutter.

6. In a machine for cutting sheet material for continuously feeding a web of sheet material, a serrated cutter, means for moving the cutter toward the web to pierce the same and for moving the cutter during the cutting operation, in the direction of feed and at a sufficiently greater rate of speed than of the web to push forward the cut portion of the web and separate the same completely from the remainder of the web.

7. In a machine for cutting sheet material a revolving serrated cutter, a mashing roll having a recess adapted to receive said cutter, means for continuously feeding a web of sheet material slidably between said cutter and said mashing roll, means for revolving said cutter to move the same during the cutting operation in the direction of feed and at a speed greater than the rate of feed of the web whereby the cutter may push forwardly the cut portion of the web and separate the same completely from the remainder of the web, and positive driving means for maintaining said mashing roll in phase with the cutter.

8. The structure set forth in claim 7, wherein said feeding means includes members positioned to engage and keep taut the portion of the web which has passed beyond the cutter.

9. In a machine for cutting sheet material a revolving serrated cutter, a mashing roll having a recess adapted to receive said cutter, means for feeding a web of sheet material slidably between said cutter and mashing roll, eccentric gears for driving said cutter to move the same during the cutting operation in the direction of feed, and at a speed greater than the rate of feed of the web whereby the cutter may push forwardly the cut portion of the web to separate the same completely from the remainder of the web, and positive driving means for maintaining said mashing roll in phase with the cutter.

10. In a machine for cutting sheet material a revolving serrated cutter, a mashing roll having a recess adapted to receive said cutter, means for feeding a web of sheet material slidably between said cutter and mashing roll, eccentric gears for driving said cutter to move the same during the cutting operation in the direction of feed, and at a speed greater than the rate of feed of the web whereby the cutter may push forwardly the cut portion of the web to separate the same completely from the remainder of the web, and means for driving said mashing roll from said cutter.

11. In a machine for cutting sheet material a feeding roll, means for rotating the same uniformly to feed a web of sheet material, a rotary cutter, eccentric gears respectively associated with said cutter and feeder roll adapted to move the cutter during the cutting operation in the direction of feed and at a speed greater than the rate of feed of the web whereby the cutter may push forwardly the cut portion of the web to separate the same completely from the remainder of the web, a mashing roll having a recess adapted to receive said cutter and positioned to permit the web of sheet material to move slidably past the same, and means for driving the mashing roll from the cutter to maintain the mashing roll in proper phase relation to the cutter.

In testimony that I claim the foregoing I have hereunto set my hand.

SETH WHEELER.

Witnesses:
W. A. WHEELER,
SETH WHEELER, Jr.